United States Patent [19]

Roe et al.

[11] Patent Number: 6,084,044
[45] Date of Patent: *Jul. 4, 2000

[54] CATALYZED PROCESS FOR PRODUCING HIGH MOLECULAR WEIGHT MONOVINYLIDENE AROMATIC POLYMERS

[75] Inventors: James M. Roe, Midland, Mich.; Jose M. Rego, Hulst, Netherlands; Duane B. Priddy, Midland, Mich.

[73] Assignee: The Dow Chemical Company, Midland, Mich.

[*] Notice: This patent is subject to a terminal disclaimer.

[21] Appl. No.: 09/307,396

[22] Filed: May 7, 1999

Related U.S. Application Data

[60] Continuation-in-part of application No. 08/806,764, Feb. 26, 1999, Pat. No. 5,962,605, which is a division of application No. 08/606,182, Feb. 23, 1996, Pat. No. 5,990,255, which is a continuation of application No. 08/459,007, Jun. 2, 1995, abandoned, which is a continuation-in-part of application No. 08/355,716, Dec. 14, 1994, abandoned.

[51] Int. Cl.$^7$ ...................... C08F 220/06; C08F 220/10; C08F 12/06

[52] U.S. Cl. .................... 526/193; 526/220; 526/222; 526/225; 526/232; 526/232.1; 526/232.3; 526/318.6; 526/329.2; 526/346; 526/347

[58] Field of Search ...................... 526/193, 220, 526/222, 225, 232, 232.1, 232.3, 318.6, 329.2, 346, 347

[56] References Cited

U.S. PATENT DOCUMENTS

| | | | |
|---|---|---|---|
| 2,914,499 | 11/1959 | Sheetz . | |
| 3,396,136 | 8/1968 | Dickerson | 526/287 |
| 3,513,120 | 5/1970 | Pohlemann | 526/287 |
| 3,711,449 | 1/1973 | Brendley | 526/287 |
| 4,241,191 | 12/1980 | Keppler | 521/56 |
| 4,367,320 | 1/1983 | Murray | 526/75 |
| 4,552,939 | 11/1985 | Thaler et al. . | |
| 4,585,825 | 4/1986 | Wesselmann | 524/504 |
| 5,068,255 | 11/1991 | Harris | 526/87 |
| 5,109,033 | 4/1992 | Grey | 526/278 |
| 5,115,055 | 5/1992 | Dais et al. | 526/225 |
| 5,145,924 | 9/1992 | Shero et al. | 526/225 |
| 5,254,650 | 10/1993 | Fukumura | 526/329.2 X |
| 5,274,027 | 12/1993 | Guilaume et al. | 524/814 |
| 5,439,999 | 8/1995 | Archer et al. | 526/278 |
| 5,608,023 | 3/1997 | Odell et al. | 526/225 |
| 5,948,874 | 9/1999 | Pike et al. | 526/225 X |

FOREIGN PATENT DOCUMENTS

| | | |
|---|---|---|
| 148548 | 12/1984 | European Pat. Off. . |
| 221498 | 10/1986 | European Pat. Off. . |
| 391675 | 4/1990 | European Pat. Off. . |
| 617062 | 3/1994 | European Pat. Off. . |
| 142268 | 8/1984 | Japan . |

OTHER PUBLICATIONS

Buzanowski, et al., Spontaneous Polymerization of Styrene in the presence of Acid: Further Confirmation of the Mayo Mechanism, Polymer, vol. 33, No. 14, p. 3055–3059 (1992).

Georges, et al., Narrow Polydispersity Polystyrene by a Free Radical Polymerization Process—Rate Enhancement, Macromolecules, 27, p. 7228–7229 (1994).

Plastic Manuf., 118: 82143r, vol. 118, p. 51–52, (1993).

*Primary Examiner*—Fred Teskin

[57] ABSTRACT

The present invention is a process for producing a high molecular weight monovinylidene aromatic polymer, comprising free radically polymerizing a vinyl aromatic monomer in the presence of less than 10 ppm of a vinyl acid having a pKa at 25° C. of less than 2.0.

10 Claims, No Drawings

CATALYZED PROCESS FOR PRODUCING HIGH MOLECULAR WEIGHT MONOVINYLIDENE AROMATIC POLYMERS

CROSS REFERENCE STATEMENT

This application is a continuation-in-part of U.S. Ser. No. 08/806,764, filed Feb. 26, 1997 and granted on Oct. 5, 1999 as U.S. Pat. No. 5,962,605, which is a divisional of U.S. Ser. No. 08/606,182, filed Feb. 23, 1996 and granted on Nov. 23, 1999 as U.S. Pat. No. 5,990,255, which is a continuation of U.S. application Ser. No. 08/459,007, filed Jun.2, 1995, now abandoned, which is a continuation-in-part of U.S. application Ser. No. 355,716, filed Dec. 14, 1994, now abandoned.

BACKGROUND OF THE INVENTION

The present invention relates to a process for producing monovinylidene aromatic polymers.

High molecular weight vinyl aromatic polymers, particularly polymers having weight average molecular weights (Mw) of greater than 300,000, have been typically produced by anionic polymerization rather than by free radical polymerization due to the slow polymerization rates used in free radical techniques to achieve high molecular weight polymers. However, anionic polymerization processes require expensive anionic initiators, such as organolithium compounds, and tend to produce discolored products due to the presence of residual lithium-containing salts.

High molecular weight vinyl aromatic polymers have also been produced by free radical polymerization in the presence of a soluble organic acid having pKa of 0.5 to 2.5, as in U.S. Pat. No. 5,145,924. However, in this process the acid does not bind to the polymer and can migrate from the polymer during use, which can cause corrosion of mold surfaces.

Therefore, it remains highly desirable to provide an improved process to produce high molecular weight monovinylidene aromatic polymers, without the disadvantages of the prior art.

SUMMARY OF THE INVENTION

The present invention is a process for producing a high molecular weight monovinylidene aromatic polymer, comprising free radically polymerizing a vinyl aromatic monomer in the presence of less than 10 ppm of a vinyl acid having a pKa at 25° C. of less than 2.0. The vinyl acid catalyzes the polymerization reaction such that high molecular weight polymers are produced in reasonable reaction times. The C—C double bonds of the vinyl acid react with the vinyl aromatic monomer such that the vinyl acid is not free to migrate from the polymer.

The high Mw polymer produced by the process of the present invention can be employed in applications where high molecular weight vinyl aromatic polymers are suitably used, such as foam sheet, foam board, films and injection molding processes. They can also be combined with polymers of differing Mw to make polymer compositions having a multimodal molecular weight distribution, preferably a bimodal molecular weight distribution, hereinafter referred to as bimodal compositions.

In another aspect of the present invention, a bimodal composition is produced containing a high molecular weight polymer from the first aspect of the present invention and a lower molecular weight polymer of a vinyl aromatic monomer.

DETAILED DESCRIPTION OF THE INVENTION

Monovinylidene aromatic polymers can be produced by free radical polymerization of vinyl aromatic monomers. Vinyl aromatic monomers for use according to the present invention include, but are not limited to, those vinyl aromatic monomers previously known for use in polymerization processes, such as those exemplified in U.S. Pat. Nos. 4,666,987, 4,572,819 and 4,585,825. Preferably, the monomer is of the formula:

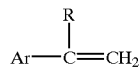

wherein R is hydrogen or methyl, Ar is phenyl, halophenyl, alkylphenyl or alkylhalophenyl, wherein any alkyl group contains 1 to 6 carbon atoms. The term halophenyl refers to a phenyl substituted with one or two halogen atoms, the term alkylphenyl refers to a phenyl substituted with one or two alkyl groups, and the term alkylhalophenyl refers to phenyl substituted with one or two alkyl groups which contain a halogen substituent or to a phenyl substituted with a halogen and an alkyl substituent. More preferably Ar is phenyl or alkylphenyl with phenyl being most preferred. In addition, the polymerization may be conducted in the presence of predissolved elastomer to prepare impact modified, or grafted rubber containing products, examples of which are described in U.S. Pat. Nos. 3,123,655, 3,346,520, 3,639,522, and 4,409,369.

The vinyl acids used in the process of the present invention may be any acid containing a vinyl group and having a pKa at 25° C. from 0.1 to 2. The pKa is used to express the extent of dissociation of acids in water, and is the negative logarithm (to the base 10) of the equilibrium constant, Ka. A vinyl group refers to a —CH=CH2 moiety. Preferably the acid catalyst is a vinyl functional sulfonic or vinyl functional phosphonic acid of the formulas:

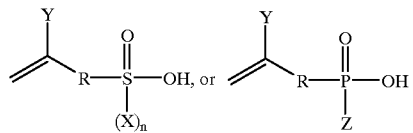

wherein X is O and n is either 0 or 1; Y is H, methyl or phenyl; Z is $C_1$–$C_6$ alkyl, aryl or O—Y; and R is —C(=O)OCH$_2$CH(Y)—, —C(=O)NHCH$_2$CH(Y)—, phenyl or a direct bond. Examples of such acids include 2-sulfoethylmethacrylate (SEM), vinylphosphonic acid (VPA), 2-sulfopropylmethacrylate (SPM), styrenesulfonic acid (SSA), styrenephosphonic acid (SPA), 4-vinylbenzylphoshonic acid (VBPA), 2-sulfoethylacrylate (SEA), α-phenylvinylphosphonic acid (PVPA), or mixtures thereof, with the most preferred vinyl acid being SEM. These acids are known and are commercially available or can be made by processes as described in U.S. Pat. No. 4,529,559 which is incorporated herein by reference.

The acid catalyst can be dispersed in a (meth)acrylic acid or ester thereof, before combining with the vinyl aromatic monomer. The term (meth)acrylic acid refers to either a methacrylic acid or an acrylic acid. A (meth) acrylic acid ester would be any $C_1$–$C_8$ ester of methacrylic acid or acrylic acid. Accordingly, throughout the application, any teachings referring to (meth)acrylic acid can also be applied to an ester thereof. The (meth)acrylic acid acts as a reactive dispersant, copolymerizing into the vinyl aromatic polymer chain during polymerization such that it does not contaminate the polymer or the volatile recycle stream. The (meth) acrylic acid also serves as a buffer for very strong acid catalysts such that they can be added to styrene without initiating cationic polymerization. The acid catalyst generally comprises from 0.1 to 75 weight percent of the acid catalyst/(meth)-acrylic acid mixture, typically from 0.5, preferably from 1, more preferably from 5, and most preferably from 10 to 75, typically to 70, preferably to 65, more preferably to 60, and most preferably to 50 weight percent of the acid catalyst/(meth)-acrylic acid mixture.

The amount of acid catalyst/(meth)acrylic acid mixture present in the polymerization, if used, is dependent upon the concentration of the acid catalyst in the mixture. Typically, the acid catalyst is present in the polymerization in amounts such that a high molecular weight polymer is produced without producing significant amounts of 1-phenyltetralin dimer. 1-Phenyltetralin dimer is formed by the reaction of the vinyl acid with the vinyl aromatic dimer formed during polymerization. 1-Phenyltetralin dimer then contaminates the high molecular weight polymer produced. Generally, the acid catalyst will be present in an amount of from 1, typically from 1.5, preferably from 2, more preferably from 2.5 and most preferably from 3 ppm to less than 10, typically to less than 9.5, preferably to less than 9, more preferably to less than 8.5 and most preferably to less than 8 ppm, based on the amount of vinyl aromatic monomer.

A free radical initiator can be used in the free radical polymerization to produce the high molecular weight polymer. Typical initiators include azo compounds and peroxides. Exemplary peroxides include tert-butylperoxybenzoate, tert-butylperoxyoctoate, di-tert-butylperoxide, dibenzoylperoxide, dilauroylperoxide, 1,1-bis-tert-butylperoxycyclohexane, 1,1,-bis -tert-butylperoxy-3,3,5-trimethylcyclohexane and dicumylperoxide.

Additionally, a solvent may be used in the process of the present invention. Representative solvents include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred solvents include substituted aromatics, with ethylbenzene, toluene and xylene being most preferred. If employed, the solvent is generally employed in an amount of up to about 35 weight percent, preferably from about 2 to about 25 weight percent, based on the total weight of the solution.

The polymerization can be conducted at any temperature at which a high molecular weight polymer will be produced. Suitable polymerization temperatures are from about 80° C. to about 170° C., preferably from about 110° C. to about 160° C., with about 115° C. to about 150° C. being the most preferred.

The Mw of the high molecular weight polymer produced in the first aspect of the present invention will typically be from about 250,000 to about 400,000, preferably from about 250,000 to about 350,000, more preferably from about 250,000 to about 330,000 and most preferably from about 300,000 to about 330,000. The Mw defined within the present specification refers to a weight average molecular weight measured using gel permeation chromatography (GPC).

If large amounts of vinyl acid are used, significant amounts of 1-phenyltetralin dimer is produced. An advantage of the process of the present invention is the low 1-phenyltetralin dimer content produced. Lower 1-phenyltetralin dimer production allows for high polymer yield and lowers production cost in 1-phenyltetralin dimer removal processes. Typically, the process of the present invention produces polymers having less than 600 ppm 1-phenyltetralin dimer content, based on the weight of the polymerization reaction mixture which contains high molecular weight polymer, unreacted monomer and any solvent, preferably less than 500, more preferably less than 400 and most preferably less than 200 ppm.

Polymodal molecular weight compositions can also be produced using the process of the present invention. In one embodiment, a low molecular weight monovinylidene aromatic polymer can be produced after the high molecular weight polymer, in order to produce a polymodal composition. A polymodal composition refers to the weight average molecular weight distribution of the polymer as having more than one distinct weight average molecular weight peak when evaluating different conversion fractions of the polymer produced. This can be accomplished by several methods known to those skilled in the art, including temperature control, and use of chain transfer agents and/or initiators, and the like. Alternatively, the low molecular weight polymer can be made previous to the high molecular weight polymer.

If an initiator is utilized to produce the low molecular weight polymer, the initiator may be any initiator or mixture of initiators which will polymerize the unreacted monomer in the mixture containing the high molecular weight polymer. The initiator can be any free radical initiator as discussed previously, and is preferably a peroxide initiator such as tert-butylperoxybenzoate, tert-butylperoxyacetate, di-tert-butylperoxide, dibenzoylperoxide, dilauroylperoxide, 1,1-bis-tert-butyl peroxycyclohexane, 1,1,-bis-tert-butylperoxy-3,3,5-trimethylcyclohexane and dicumylperoxide. Typical amounts of initiator are from 10 ppm to 2000 ppm based on the amount of vinyl aromatic monomer.

Optionally, chain transfer agents may be utilized in the preparation of the low molecular weight polymer. Suitable chain transfer agents include common chain transfer agents known in the art such as mercaptans. Preferably, the chain transfer agent is n-dodecylmercaptan or terpinoline. Typical amounts of chain transfer agents are from 10 ppm to 4000 ppm based on the amount of vinyl aromatic monomer.

The molecular weight of the high molecular weight polymer in the polymodal composition can be selected according to the desired Mw of the polymodal composition and is preferably from about 300,000 to about 2,000,000 more preferably from about 350,000 to about 1,500,000, and most preferably from about 400,000 to about 800,000.

The desired Mw of the low molecular weight polymer is also a matter of choice and is dependent upon the desired Mw of the bimodal composition and the desired properties. Preferably the Mw is from about 50,000 to about 200,000.

The amount of high molecular weight polymer present in the polymodal composition can be selected according to the desired properties of the polymodal composition. Typically, from 1 to 99 percent, preferably from 5 to 55 percent, and most preferably from 10 to 30 percent of the high molecular weight polymer is present.

The average Mw of polymodal compositions is dependent upon the Mw of the polymers contained within the composition. The average Mw of the bimodal composition of this embodiment of the present invention is preferably from about 120,000 to about 600,000, more preferably from about 130,000 to about 500,000, and most preferably from about 140,000 to 400,000.

The composition containing both high and low molecular weight vinyl aromatic polymers may be any combination of two vinyl aromatic polymers but is preferably a blend of polymers having the same composition (i.e., homopolymers of the same monomeric units or copolymers having the same comonomeric units in similar ratios). More preferably, both polymers are polystyrene.

A preferred process for the production of the bimodal composition is a continuous polymerization process wherein a group of several distinct reaction zones within one or more reactors are used in series to create the different molecular weight polymers. The different zones are maintained at the desired temperatures and supplied with the appropriate reactants necessary to produce the desired amounts of polymer having the specified molecular weights, such that polymodal compositions are produced.

In a preferred process, an earlier polymerization zone is maintained such that a high molecular weight polymer is produced, while a later zone receives the reaction mixture from the previous zone, including the high molecular weight polymer. The later zone is optionally supplied with additional reactants, including an initiator and/or a chain transfer agent, and is otherwise maintained such that it produces a low molecular weight polymer in the presence of the previously produced high molecular weight polymer, a blend of the two components being achieved thereby. Usually, the earlier high molecular weight polymer-producing reactor or zone is at a lower temperature than the subsequent low molecular weight polymer producing reactor or zone.

Bimodal compositions containing high molecular weight and low molecular weight polymers are useful for a variety of applications including foam board, foam sheet, injection molding, and extrusion.

Other traditional polymer additives may also be included in the process of the present invention, including plasticizers and mold release agents.

The following examples are provided to illustrate the present invention. The examples are not intended to limit the scope of the present invention and they should not be so interpreted. Amounts are in weight parts or weight percentages unless otherwise indicated.

EXAMPLE 1

A styrene solution is made containing six weight percent ethylbenzene and 175 ppm 1,1,-bis-tert-butylperoxycyclohexane, based on the amount of styrene monomer. 1.5 grams of solution is placed in each of 6 glass ampules having an inner diameter of 0.5 cm. and a length of 160 mm, together with the appropriate amount of 2-sulfoethylmethacrylate (SEM) as listed in Table I. The ampoules are sealed and placed in an oil bath, wherein the temperature is increased from 100 to 120° C. over 30 minutes and then from 120 to 126° C. over 6 minutes, where the temperature is maintained for an additional 54 minutes. The ampoules are removed, cooled, opened and the contents analyzed for molecular weight using gel permeation chromatography (GPC) and 1-phenyltetralin dimer content using gas chromatography. The results are listed in Table I.

Table I

| SAMPLE | SEM content (ppm) | Mn/1000 | Mw/1000 | Dimer content (ppm) |
|---|---|---|---|---|
| 1 | 0 | 157 | 294 | 0 |
| 2 | 3 | 163 | 304 | 168 |
| 3 | 6 | 170 | 315 | 395 |
| 4 | 9 | 182 | 332 | 564 |
| 5* | 18 | 191 | 347 | 830 |
| 6* | 100 | 196 | 351 | 1113 |

*comparative examples

The process of the present invention produces high Mw polymers having low 1-phenyltetralin dimer content. At levels above 10 ppm, the molecular weight increase is small, while the amount of dimer increases dramatically.

What is claimed is:

1. A process for producing a high molecular weight monovinylidene aromatic polymer, comprising free radically polymerizing a vinyl aromatic monomer in the presence of less than 10 ppm of a vinyl acid catalyst having a pKa at 25° C. of less than 2.0.

2. The process of claim 1 wherein the acid catalyst is a vinyl functional sulfonic or vinyl functional phosphonic acid of the formula:

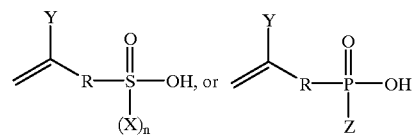

wherein X is O and n is either 0 or 1; Y is H, methyl or phenyl; Z is C1–C6 alkyl, aryl or O—Y; and R is —C(=O)OCH$_2$CH(Y), —C(=O)NHCH2CH(Y)—, phenyl or a direct bond.

3. The process of claim 2 wherein the vinyl acid is 2-sulfoethylmethacrylate, acrylamidopropanesulfonic acid, 2-sulfopropylmethacrylate, styrenesulfonic acid, or 2-sulfatoethylmethacrylate.

4. The process of claim 1 wherein the vinyl aromatic monomer is styrene.

5. The process of claim 1 wherein the acid catalyst is dispersed in a (meth)acrylic acid or ester thereof, before combining with the vinyl aromatic monomer.

6. The process of claim 1 wherein a free radical initiator is also present.

7. The process of claim 6 wherein the free radical initiator is selected from the group consisting of tert-butylperoxybenzoate, tert-butylperoxyacetate, di-tert-butylperoxide, dibenzoylperoxide, dilauroylperoxide, 1,1-bis-tert-butyl peroxycyclohexane, 1,1-bis-tert-butylperoxy-3,3,5-trimethylcyclohexane and dicumylperoxide.

8. The process of claim 1 wherein the molecular weight of the high molecular weight polymer is from 250,000 to 400,000.

9. The process of claim 1 wherein a polymerization reaction mixture comprising high molecular weight polymer, unreacted monomer and any solvent is produced and contains less than 600 ppm 1-phenyltetralin dimer, based on the weight of the polymerization reaction mixture.

10. The process of claim 1 which additionally comprises producing a low molecular weight polymer either after, or previous to, the production of high molecular weight polymer, to produce a polymodal composition.

* * * * *